United States Patent
Kim et al.

(10) Patent No.: US 10,923,752 B2
(45) Date of Patent: Feb. 16, 2021

(54) MEMBRANE-ELECTRODE ASSEMBLY, METHOD FOR MANUFACTURING SAME, AND FUEL CELL COMPRISING SAME

(71) Applicant: KOLON INDUSTRIES, INC., Seoul (KR)

(72) Inventors: Jun-Young Kim, Yongin-si (KR); Jin-Hwa Lee, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 33 days.

(21) Appl. No.: 16/341,138

(22) PCT Filed: Dec. 28, 2017

(86) PCT No.: PCT/KR2017/015630
§ 371 (c)(1),
(2) Date: Apr. 11, 2019

(87) PCT Pub. No.: WO2018/124764
PCT Pub. Date: Jul. 5, 2018

(65) Prior Publication Data
US 2020/0044271 A1    Feb. 6, 2020

(30) Foreign Application Priority Data

Dec. 29, 2016  (KR) .................. 10-2016-0182363
Dec. 28, 2017  (KR) .................. 10-2017-0181852

(51) Int. Cl.
*H01M 8/02*    (2016.01)
*H01M 8/1004*  (2016.01)
(Continued)

(52) U.S. Cl.
CPC ....... *H01M 8/1004* (2013.01); *H01M 4/8668* (2013.01); *H01M 4/92* (2013.01);
(Continued)

(58) Field of Classification Search
CPC .... H01M 8/1004; H01M 4/8668; H01M 4/92; H01M 8/1053; H01M 8/1067;
(Continued)

(56) References Cited

U.S. PATENT DOCUMENTS

2006/0068268 A1   3/2006  Olmeijer
2008/0248363 A1*  10/2008 Amarakoon ........ H01M 8/1246
                                                    429/495
(Continued)

FOREIGN PATENT DOCUMENTS

JP    07-135004 A    5/1995
JP    08-088007 A    4/1996
(Continued)

OTHER PUBLICATIONS

International Search Report for PCT/KR2017/015630 dated Apr. 24, 2018 [PCT/ISA/210].

*Primary Examiner* — Cynthia K Walls
(74) *Attorney, Agent, or Firm* — Harvest IP Law, LLP (57) ABSTRACT

Disclosed are a membrane-electrode assembly, a method of manufacturing the same, and a fuel cell including the membrane-electrode assembly. The membrane-electrode assembly includes a catalyst layer, an interfacial adhesive layer which is positioned on the catalyst layer and formed by permeating an interface between the interfacial adhesive layer and the catalyst layer into a partial depth of the catalyst layer, and an ion exchange membrane which is positioned on the interfacial adhesive layer and bonded to the catalyst layer by the medium of the interfacial adhesive layer, the interfacial adhesive layer including a fluorine-based ionomer having an equivalent weight (EW) of 500 to 1000 g/eq.

12 Claims, 3 Drawing Sheets

(51) Int. Cl.
*H01M 4/86* (2006.01)
*H01M 4/92* (2006.01)
*H01M 8/1053* (2016.01)
*H01M 8/1067* (2016.01)
*H01M 8/1018* (2016.01)

(52) U.S. Cl.
CPC ....... *H01M 8/1053* (2013.01); *H01M 8/1067* (2013.01); *H01M 2008/1095* (2013.01); *H01M 2300/0082* (2013.01); *H01M 2300/0094* (2013.01)

(58) Field of Classification Search
CPC . H01M 2008/1095; H01M 2300/0082; H01M 2300/0094; H01M 8/1048; H01M 8/1051; H01M 4/8657; H01M 8/04197; Y02E 60/521; Y02P 70/56
See application file for complete search history.

(56) References Cited

U.S. PATENT DOCUMENTS

| | | |
|---|---|---|
| 2009/0233148 A1 | 9/2009 | Kim et al. |
| 2010/0291470 A1* | 11/2010 | Sadasue ............. H01M 8/1053 429/483 |
| 2011/0223515 A1* | 9/2011 | Kim ................... H01M 8/1004 429/465 |
| 2015/0236367 A1* | 8/2015 | Kim ................... H01M 8/1046 429/482 |
| 2016/0301092 A1* | 10/2016 | Kim ................... H01M 8/1051 |

FOREIGN PATENT DOCUMENTS

| | | |
|---|---|---|
| JP | 11-040172 A | 2/1999 |
| JP | 2003-502828 A | 1/2003 |
| JP | 2004-006306 A | 1/2004 |
| JP | 2005-539352 A | 12/2005 |
| JP | 2006-269133 A | 10/2006 |
| JP | 2007-026820 A | 2/2007 |
| JP | 4023903 B2 | 12/2007 |
| JP | 2008-512844 A | 4/2008 |
| JP | 2011-076909 A | 4/2011 |
| JP | 2011-187436 A | 9/2011 |
| KR | 10-0614100 B1 | 8/2006 |
| KR | 10-0677729 B1 | 2/2007 |
| KR | 10-2007-0055225 A | 5/2007 |
| KR | 10-2008-0102938 A | 11/2008 |
| KR | 10-2009-0098217 A | 9/2009 |
| KR | 10-2015-0097024 A | 8/2015 |
| KR | 10-2016-0120078 A | 10/2016 |
| WO | 2005/029624 A1 | 3/2005 |
| WO | 2010/048405 A1 | 4/2010 |
| WO | 2010/150871 A1 | 12/2010 |

* cited by examiner

MEMBRANE-ELECTRODE ASSEMBLY, METHOD FOR MANUFACTURING SAME, AND FUEL CELL COMPRISING SAME

CROSS REFERENCE TO RELATED APPLICATIONS

This application is a National Stage of International Application No. PCT/KR2017/015630 filed Dec. 28, 2017, claiming priority based on Korean Patent Application Nos. 10-2016-0182363 filed Dec. 29, 2016 & 10-2017-0181852 filed Dec. 28, 2017.

TECHNICAL FIELD

The present invention relates to a membrane-electrode assembly, a method of manufacturing the same and a fuel cell including the same, and more particularly, to a membrane-electrode assembly which can overcome a problem of deteriorating hydrogen ion conduction performance of the membrane-electrode assembly by improving interfacial adhesion and interfacial stability between a catalyst layer and an ion exchange membrane, which reduces crossover of hydrogen gas by decreasing gas permeability without an increase in interfacial resistance or a problem in interfacial bonding, and which can improve performance and durability under the conditions of high temperature and low humidity, a method of manufacturing the same, and a fuel cell including the same.

BACKGROUND ART

Fuel cells, as batteries including a power generation system for directly converting energy of chemical reaction such as an oxidation/reduction reaction of hydrogen and oxygen contained in hydrocarbon-based fuel materials including methanol, ethanol and natural gas into electric energy, have been spotlighted as a next generation clean energy source which can replace fossil energy due to their environment-friendly characteristics of high energy efficiency and low contaminant discharge.

Such fuel cells have been receiving attention as small or mobile portable power supplies since the fuel cells have advantages of generating outputs of various ranges due to a stack configuration formed by stacking unit cells and exhibit 4 to 10 times of energy densities compared to small lithium batteries.

A stack which substantially generates electricity in the fuel cells has a structure in which several to tens of unit cells including a membrane-electrode assembly (MEA) and a separator (or referred to as a bipolar plate) are stacked, wherein the membrane-electrode assembly generally has a structure in which the oxidization electrode and the reduction electrode are each formed at both sides of the electrolyte membrane in a state that an electrolyte membrane is disposed between an oxidization electrode (anode or fuel electrode) and a reduction electrode (cathode or air electrode).

The fuel cells can be classified into alkaline electrolyte fuel cells, polymer electrolyte membrane fuel cells (PEMFC) and the like according to conditions and types of electrolytes. The polymer electrolyte membrane fuel cells among the fuel cells are attracting more attention as power source devices for portable, automobile and domestic applications, due to their advantages such as a low operation temperature of less than 100° C., fast starting and response characteristics, and excellent durability.

Typical examples of the polymer electrolyte membrane fuel cells may include proton exchange membrane fuel cells (PEMFC) using hydrogen gas as a fuel, direct methanol fuel cells (DMFC) using liquid methanol as the fuel, and others.

A reaction occurring in the polymer electrolyte membrane fuel cells may be summarized as follows. First, when the fuel such as the hydrogen gas is supplied to the oxidization electrode, hydrogen ions ($H^+$) and electrons ($e^-$) are generated in the oxidization electrode by oxidation reaction of hydrogen. The generated hydrogen ions are transferred to the reduction electrode through a polymer electrolyte membrane, and the generated electrons are transferred to the reduction electrode through an external circuit. Oxygen is supplied from the reduction electrode, and oxygen is combined with the hydrogen ions and electrons to produce water by reduction reaction of oxygen.

On the other hand, miniaturization of a fuel cell system is essential to apply the fuel cells to a fuel cell vehicle (FCV). In order to miniaturize the fuel cell system, development of a membrane-electrode assembly (MEA) which can exhibit excellent output density per unit area is required, and an increase in durability of a MEA catalyst layer is needed particularly for actual operation of the FCV.

At present, a MEA for polymer electrolyte membrane fuel cells for the application to an FCV field has technical limits including performance deterioration and remarkable durability reduction of MEA and the like due to a long time operation, and major MEA durability/performance deterioration issues are as follows.

That is, the major MEA durability/performance deterioration issues include a problem that a catalyst layer and a catalyst are degraded by potential cycling generated during load cycling, a problem that a carbon carrier is corroded by high cathode potential during startup/shutdown, a problem that physical and chemical durability properties of a thin film type polymer electrolyte membrane for increasing conductivity are deteriorated, a problem that performance and durability of the MEA are lowered due to functionality deterioration or resistance increase in the interface, and others.

Further, durability or EOL (end-of-life) performance deterioration of the MEA generated during operation of the polymer electrolyte membrane fuel cells has been known to be caused by degradation of the catalyst, corrosion of the carbon carrier, durability deterioration of the polymer electrolyte membrane, and problems generated at interfaces between respective components.

It is required to develop a technology which can improve interfacial adhesion without performance deterioration of the MEA to solve problems generated due to performance deterioration and durability degradation caused by a phenomenon occurring in an MEA interface among the problems.

Disclosure

Technical Problem

An objective of the present invention is to provide a membrane-electrode assembly which can overcome a problem of deteriorating hydrogen ion conduction performance of the membrane-electrode assembly by improving interfacial adhesion and interfacial stability between the catalyst layer and ion exchange membrane, which reduces crossover of hydrogen gas by decreasing gas permeability without an increase in interfacial resistance or a problem in interfacial bonding, and which can improve performance and durability under the conditions of high temperature/low humidity.

Furthermore, other objective of the present invention to provide a method of manufacturing the membrane-electrode assembly.

Furthermore, another objective of the present invention is to provide a fuel cell including the membrane-electrode assembly.

Technical Solution

An embodiment of the present invention provides a membrane-electrode assembly comprising a catalyst layer, an interfacial adhesive layer which is positioned on the catalyst layer and formed by permeating an interface between the interfacial adhesive layer and the catalyst layer into a partial depth of the catalyst layer, and an ion exchange membrane which is positioned on the interfacial adhesive layer and bonded to the catalyst layer by the medium of the interfacial adhesive layer, the interfacial adhesive layer including a fluorine-based ionomer having an equivalent weight (EW) of 500 to 1000 g/eq.

The membrane-electrode assembly includes a first interfacial adhesive layer and a first catalyst layer which are positioned on one side of the ion exchange membrane and a second interfacial adhesive layer and a second catalyst layer which are positioned on the other side of the ion exchange membrane, any one selected from the group consisting of the first interfacial adhesive layer, the second interfacial adhesive layer and both thereof may be the interfacial adhesive layer, and any one selected from the group consisting of the first catalyst layer, the second catalyst layer and both thereof may be the catalyst layer.

The interfacial adhesive layer may be permeated into and filled in any one selected from the group consisting of a pore (surface recess) formed in the surface of the catalyst layer, a pore existing in a predetermined depth from the surface of the catalyst layer, and both thereof.

The interfacial adhesive layer may be permeated into the catalyst layer in an average depth corresponding to 1 to 10% of an average thickness of the catalyst layer.

The interfacial adhesive layer may have an average thickness of 0.01 to 5 μm.

The interfacial adhesive layer may comprise a mixture of the fluorine-based ionomer and a hydrocarbon-based ionomer having an ion exchange capacity (IEC) of 0.8 to 4.0 meq/g.

The fluorine-based ionomer and the hydrocarbon-based ionomer may be mixed at a weight ratio of 20:1 to 1:20.

The interfacial adhesive layer may further comprise a nanopowder having an average particle diameter of 1 to 50 nm.

The interfacial adhesive layer may comprise 0.1 to 20 wt % of the nanopowder with respect to the total weight of the interfacial adhesive layer.

The nanopowder may be any one selected from the group consisting of an ionic conductor, a radical scavenger, an oxygen revolution reaction (OER) catalyst, and a mixture thereof.

The ionic conductor may be any one hydrophilic inorganic additive selected from the group consisting of $SnO_2$, fumed silica, clay, alumina, mica, zeolite, phosphotungstic acid, silicon tungstic acid, zirconium hydrogen phosphate, and a mixture thereof.

The radical scavenger may be any one selected from the group consisting of cerium, tungsten, ruthenium, palladium, silver, rhodium, cerium, zirconium, yttrium, manganese, molybdenum, lead, vanadium, titanium, ion forms thereof, oxide forms thereof, salt forms thereof, and mixtures thereof.

The oxygen revolution reaction catalyst may be any one platinum-based catalyst selected from the group consisting of platinum, gold, palladium, rhodium, iridium, ruthenium, osmium, a platinum alloy, alloys thereof, and mixtures thereof.

Other embodiment of the present invention provides a method of manufacturing the membrane-electrode assembly, the method comprising the steps of coating an interfacial adhesive layer-forming composition on the catalyst layer to form the interfacial adhesive layer, and bonding the interfacial adhesive layer-formed catalyst layer to the ion exchange membrane, the interfacial adhesive layer being formed by permeating the interface between the interfacial adhesive layer and the catalyst layer into the partial depth of the catalyst layer, and the interfacial adhesive layer including the fluorine-based ionomer having the equivalent weight (EW) of 500 to 1000 g/eq.

The interfacial adhesive layer may be formed by spray coating the interfacial adhesive layer-forming composition on the catalyst layer.

The interfacial adhesive layer may comprise the mixture of the fluorine-based ionomer and the hydrocarbon-based ionomer having the ion exchange capacity (IEC) of 0.8 to 4.0 meq/g.

The interfacial adhesive layer may further comprise a nanopowder having a particle diameter of 1 to 50 nm.

Another embodiment of the present invention provides a fuel cell including the membrane-electrode assembly.

Advantageous Effects

The membrane-electrode assembly of the present invention can overcome a problem of deteriorating hydrogen ion conduction performance of the membrane-electrode assembly by improving interfacial adhesion and interfacial stability between the catalyst layer and the ion exchange membrane, reduces crossover of hydrogen gas by decreasing gas permeability without an increase in interfacial resistance or a problem in interfacial bonding, and can improve performance and durability under the conditions of high temperature and low humidity.

BEST MODE FOR CARRYING OUT THE INVENTION

Hereinafter, embodiments of the present invention will be described in detail. However, these embodiments are only exemplary, the present invention is not limited thereto, but is only defined by the scope of the claims described below.

Unless particularly stated otherwise in the specification, it will be understood that, when an element such as a layer, film, region, plate, or the like is referred to as being formed "on" another element, it can be directly "on" the other element or be indirectly formed with intervening elements therebetween.

A membrane-electrode assembly according to an embodiment of the present invention comprises a catalyst layer, an interfacial adhesive layer which is positioned on the catalyst layer and formed by permeating an interface between the interfacial adhesive layer and the catalyst layer into a partial depth of the catalyst layer, and an ion exchange membrane which is positioned on the interfacial adhesive layer and bonded to the catalyst layer by the medium of the interfacial adhesive layer.

Figure 1:
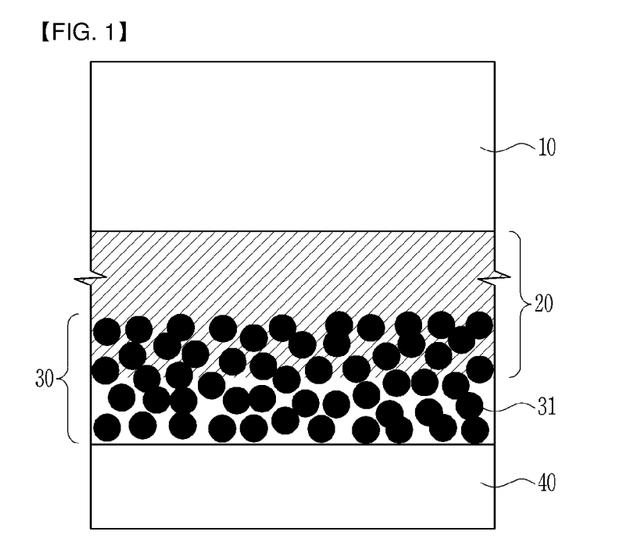
FIG. 1 is a schematic diagram showing an interfacial structure of an ion exchange membrane, an interfacial adhesive layer and a catalyst layer in a membrane-electrode assembly according to an embodiment of the present invention.

FIG. 1 is a schematic diagram showing the interfacial structure of an ion exchange membrane, the adhesive layer and the catalyst layer in the membrane-electrode assembly according to an embodiment of the present invention.

As illustrated in FIG. 1, an interfacial adhesive layer 20 is interposed between an ion exchange membrane 10 of the membrane-electrode assembly and a catalyst layer 30 which is formed of catalyst particles 31, and an interface between the catalyst layer 30 which is formed of the catalyst particles 31 and the interfacial adhesive layer 20 is formed in such a form that the interface is penetrated between the catalyst particles 31 of the catalyst layer 30. The membrane-electrode assembly may further comprise an electrode substrate 40 at an outer side of the catalyst layer 30.

The membrane-electrode assembly includes a first interfacial adhesive layer and a first catalyst layer which are positioned on one side of the ion exchange membrane 10 and a second interfacial adhesive layer and a second catalyst layer which are positioned on the other side of the ion exchange membrane 10, any one selected from the group consisting of the first interfacial adhesive layer, the second interfacial adhesive layer and both thereof may be the interfacial adhesive layer 20, and any one selected from the group consisting of the first catalyst layer, the second catalyst layer and both thereof may be the catalyst layer 30. Here, the first catalyst layer may be a cathode catalyst layer, and the second catalyst layer may be an anode catalyst layer.

The interfacial adhesive layer 20 may be formed by permeating and filling in any one selected from the group consisting of a pore (surface recess) formed in the surface of the catalyst layer 30, a pore existing in a predetermined depth from the surface of the catalyst layer 30, and both thereof.

As a result, the interfacial adhesive layer 20 can maximize a contact area between the catalyst particles 31 and the ion exchange membrane 10 by filling all empty spaces between the catalyst particles 31 and the ion exchange membrane 10. Pores do not exist between the ion exchange membrane 10 and the catalyst particles 31, and the interface between the catalyst layer 30 and the interfacial adhesive layer 20 is formed along surface curves of the catalyst particles 31 to obtain a widened interfacial area. Accordingly, the widened interfacial area may increase ion transfer paths and improve adhesive strength between the catalyst layer 30 and the ion exchange membrane 10.

The interfacial adhesive layer 20 may be permeated into the catalyst layer 30 in an average depth corresponding to 1 to 10% or 2 to 5% of an average thickness of the catalyst layer 30. When the interfacial adhesive layer 20 is permeated in the average depth range, there is an effect that output performance is excellent while obtaining a high binding effect between the catalyst layer 30 and the interfacial adhesive layer 20. The average depth of the interfacial adhesive layer 20 permeated into the catalyst layer 30 or the average thickness of the catalyst layer 30 may be an average value of depth values or thickness values measured with respect to the total of the catalyst layer 30, or may be an average value per unit length (for example, cm) in one cross-section of the catalyst layer 30. The % (length %) is a percentage value of a value obtained by dividing an average permeation depth of the interfacial adhesive layer 20, i.e., a length unit by the average thickness of the catalyst layer 30, i.e., a length unit.

The interfacial adhesive layer 20 may include a fluorine-based ionomer having an equivalent weight (EW) of 500 to 1000 g/eq, and may include a fluorine-based ionomer having an equivalent weight of 550 to 950 g/eq. The equivalent weight of the fluorine-based ionomer is a molecular mass of the fluorine-based ionomer per one ion conductive functional group included in the fluorine-based ionomer.

Adjusting the equivalent weight of the fluorine-based ionomer included in the interfacial adhesive layer 20 can give a positive effect to management of water in the membrane-electrode assembly under the conditions of low humidity, and performance of the membrane-electrode assembly can be improved without deteriorating conductivity of hydrogen ions when the fluorine-based ionomer having the equivalent weight is used. On the other hand, an elution phenomenon of the fluorine-based ionomer or permeability of a hydrogen fuel may be increased when the fluorine-based ionomer has an equivalent weight of less than 500 g/eq, and conductivity of the hydrogen ions may be deteriorated under the conditions of high temperature and low humidity when the fluorine-based ionomer has an equivalent weight of more than 1000 g/eq.

The fluorine-based ionomer may be: a fluoro-based polymer which has a cation exchange group such as proton, or an anion exchange group such as a hydroxy ion, carbonate or bicarbonate, and has fluorine included in a main chain thereof; a partially fluorinated polymer such as a polystyrene-graft-ethylene-tetrafluoroethylene copolymer, a polystyrene-graft-polytetrafluoroethylene copolymer, or the like; or others. Specific examples of the fluorine-based ionomer may include fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof. The cation exchange group may be any one selected from the group consisting of a sulfonic acid group, a carboxyl group, a boronic acid group, a phosphoric acid group, an imide group, a sulfoneimide group, a sulfoneamide group and a combination thereof, and may generally be the sulfonic acid group or the carboxyl group. Further, the fluorine-based ionomers may be used alone or in a mixture of two or more thereof.

The fluorine-based ionomer may include a mixture in which the exemplified fluorine-based ionomers are appropriately mixed to satisfy the equivalent weight range.

Further, the interfacial adhesive layer 20 may comprise a mixture of the fluorine-based ionomer and the hydrocarbon-based ionomer. When the interfacial adhesive layer 20 comprises the mixture of the fluorine-based ionomer and the hydrocarbon-based ionomer, the interfacial adhesive layer 20 can prevent a hydrogen crossover phenomenon by reducing gas permeability without affecting interfacial bonding.

In this case, the hydrocarbon-based ionomer may have an ion exchange capacity (IEC) of 0.8 to 4.0 meq/g, or 1.0 to 3.5 meq/g. When the hydrocarbon-based ionomer has an ion exchange capacity within the range, performance of the membrane-electrode assembly can be improved without deteriorating conductivity of the hydrogen ions under the conditions of high temperature and low humidity. Movements of the hydrogen ions under the conditions of high temperature and low humidity may be deteriorated when the hydrocarbon-based ionomer has an ion exchange capacity of less than 0.8 meq/g, and interfacial resistance and transfer resistance may be increased according to humidification when the hydrocarbon-based ionomer has an ion exchange capacity of more than 4.0 meq/g.

Further, the fluorine-based ionomer and the hydrocarbon-based ionomer may be mixed at a weight ratio of 20:1 to 1:20, or 1:1 to 1:10. When the hydrocarbon-based ionomer is mixed at a weight ratio within the range, the hydrogen crossover phenomenon can be reduced, and interfacial adhesion is increased such that performance and lifetime of the membrane-electrode assembly can be improved. When the hydrocarbon-based ionomer is mixed at a weight ratio of less than 1, it may be difficult to exhibit an effect of reducing permeability of the hydrogen fuel. When the hydrocarbon-based ionomer is mixed at a weight ratio of more than 20, an ionomer blend may be non-uniformly distributed, and resistance of the electrolyte membrane may be greatly increased.

The hydrocarbon-based ionomer has a cation exchange group such as proton, or an anion exchange group such as a hydroxy ion, carbonate or bicarbonate, and may have a hydrocarbon-based polymer such as benzimidazole, polyamide, polyamideimide, polyimide, polyacetal, polyethylene, polypropylene, acrylic resin, polyester, polysulfone, polyether, polyether imide, polyester, polyethersulfone, polyether imide, polycarbonate, polystyrene, polyphenylene sulfide, polyether ether ketone, polyether ketone, polyarylethersulfone, polyphosphazene, polyphenylquinoxaline, or the like included in a main chain thereof. Although specific examples of the hydrocarbon-based ionomer may include hydrocarbon-based polymers comprising sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and a mixture thereof, the hydrocarbon-based ionomer are not limited thereto. Further, the hydrocarbon-based ionomers may be used alone or in a mixture of two or more thereof.

Further, the interfacial adhesive layer 20 may further comprise a nanopowder.

The nanopowder can overcome durability deterioration of the membrane-electrode assembly and can improve performance of the membrane-electrode assembly by giving functionality to the interfacial adhesive layer 20 without deteriorating interfacial adhesion of the membrane-electrode assembly or increasing interfacial resistance of the membrane-electrode assembly.

The nanopowder may be any one selected from the group consisting of an ionic conductor, a radical scavenger, an oxygen revolution reaction (OER) catalyst, and a mixture thereof.

The ionic conductor can improve hydrogen ion conductivity of the membrane-electrode assembly since the ionic conductor is excellent in dispersibility. Specifically, the ionic conductor as a hydrophilic inorganic additive may be any one selected from the group consisting of $SnO_2$, fumed silica, clay, alumina, mica, zeolite, phosphotungstic acid, silicon tungstic acid, zirconium hydrogen phosphate, and a mixture thereof. The ionic conductor as a hydrophilic inorganic ion additive can prevent a phenomenon that hydrogen ion conductivity is deteriorated under the conditions of high temperature and low humidity.

The radical scavenger can contribute to stabilization of the membrane-electrode assembly since the radical scavenger is uniformly dispersed in the interfacial adhesive layer 20. Specifically, the radical scavenger, as ions of transition metal which is capable of inhibiting generation of hydroxy radicals by decomposing hydrogen peroxide into water and oxygen, may include cerium, tungsten, ruthenium, palladium, silver, rhodium, cerium, zirconium, yttrium, manganese, molybdenum, lead, vanadium, titanium and the like, and can also include the metals themselves, ion forms thereof, oxide forms thereof, salt forms thereof, or other forms thereof.

More specifically, the radical scavenger may be any one selected from the group consisting of $CeO_2$, $MnO_2$, $CsO_2$, $ZrO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3 \cdot 8H_2O$, $Ce(CHCOO)_3 \cdot H_2O$, $CeCl_3 \cdot 6H_2O$, $Ce(NO_3)_6 \cdot 6H_2O$, $Ce(NH_4)_2(NO_3)_6$, $Ce(NH_4)_4(SO_4)_4 \cdot 4H_2O$, $Ce(CH_3COCHCOCH_3)_3 \cdot 3H_2O$, Fe-porphyrin, Co-porphyrin and a mixture thereof, and may include a mixture or a compound of one or more thereof.

The oxygen revolution reaction catalyst is atomized or uniformly dispersed in the interfacial adhesive layer 20 such that the oxygen revolution reaction catalyst can improve durability of the catalyst layer 30 through an effective water decomposition reaction.

The oxygen revolution reaction catalyst may include a platinum-based metal active material. The platinum-based metal may include one selected from the group consisting of platinum, gold, palladium, rhodium, iridium, ruthenium, osmium, a platinum alloy, an alloy thereof and a mixture thereof, or a mixture of two or more thereof. The platinum alloy may include one selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir and a combination thereof, or a mixture of two or more thereof.

Further, the catalyst particles 31 may include a metal itself (black), and a catalyst metal supported on a carrier. The carrier may include porous inorganic oxides such as zirconia, alumina, titania, silica, ceria, ITO, WO, $SnO_2$, $ZnO_2$ and the like, or a combination thereof. Further, a carbon-based carrier may be any one selected from the group consisting of carbon fiber, carbon sheet, carbon black, carbon nanotube, carbon nanofiber, carbon nanowire, carbon nanoball, carbon nano-horn, carbon nano-cage, graphene, stabilization carbon, activation carbon, and a mixture thereof.

The nanopowder may have an average particle diameter of 1 to 50 nm, or 2 to 35 nm. When the average particle diameter of the nanopowder is within the range, the nanopowder is uniformly dispersed in the interfacial adhesive layer 20, and the membrane-electrode assembly can be realized without greatly increasing resistance. When the average particle diameter of the nanopowder is deviated from the range, an aggregation phenomenon between particles of the nanopowder, or dispersibility deterioration or a phase separation phenomenon within the composition may be generated.

The interfacial adhesive layer 20 may comprise 0.1 to 20 wt %, or 0.5 to 15 wt % of the nanopowder with respect to the total weight of the interfacial adhesive layer 20. When the nanopowder is contained within the amount range, the interfacial adhesive layer 20 which can uniformly comprise the nanopowder without phase separation within the interfacial adhesive layer 20 may be formed. When the nanopowder is contained in an amount of less than 0.1 wt %, it may be difficult to achieve a hydrogen ion conductivity improving effect, a radical generation inhibiting effect and an effective water decomposition reaction. When the nanopowder is contained in an amount of more than 20 wt %, effects of improving output performance and durability of the membrane-electrode assembly may not be achieved due to dispersibility deterioration of the nanopowder resulting in deterioration of the hydrogen ion conductivity, increases of ionic resistance, charge transfer resistance and mass transfer resistance, and non-uniform water decomposition reaction under the conditions of high temperature and low humidity.

The interfacial adhesive layer 20 may have an average thickness of 0.01 to 5 μm, or 0.5 to 3 μm. The catalyst layer 30, the interfacial adhesive layer 20 and the ion exchange membrane 10 may have a total thickness of 18 to 40 μm when the interfacial adhesive layer 20 is positioned at a cathode side, and the catalyst layer 30, the interfacial adhesive layer 20 and the ion exchange membrane 10 may have a total thickness of 2 to 35 μm when the interfacial adhesive layer 20 is positioned at an anode side.

When the interfacial adhesive layer 20 has an average thickness of less than 0.01 μm, interfacial adhesion between an electrolyte membrane and an electrode may not be improved. When the interfacial adhesive layer 20 has an average thickness of more than 5 μm, performance of the membrane-electrode assembly may be deteriorated since interfacial and transfer resistance components are increased.

On the other hand, it is fine to use as the catalyst particles 31 of the catalyst layer 30 any materials which can be used as a catalyst in a hydrogen oxidation reaction and an oxygen reduction reaction, and a platinum-based metal may be preferably used as the catalyst particles 31 of the catalyst layer 30.

The platinum-based metal may include platinum (Pt), palladium (Pd), ruthenium (Ru), iridium (Ir), osmium (Os), a platinum-M alloy (M is one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La) and rhodium (Rh)), and one selected from the group consisting of a combination thereof, and more preferably a combination of two or more metals selected from the platinum-based catalyst metal group. However, the platinum-based metal is not limited thereto, and the platinum-based catalyst metal may be used without limitation if the platinum-based metal is a platinum-based catalyst metal usable in the art.

Further, the catalyst particles 31 may include a metal itself (black), and a catalyst metal supported on the carrier.

The carrier may be selected from a carbon-based carrier, porous inorganic oxides such as zirconia, alumina, titania, silica, ceria and the like, zeolite, and others. The carbon-based carrier may be selected from graphite, super P, carbon fiber, carbon sheet, carbon black, Ketjen black, Denka black, acetylene black, carbon nanotube (CNT), carbon sphere, carbon ribbon, fullerene, activation carbon, and a combination of one or more thereof. However, the carbon-based carrier is not limited thereto, and carriers usable in the art may be used without limitation.

The catalyst particles 31 may be positioned on the surface of the carrier, and may be penetrated into the carrier while filling internal pores of the carrier.

When a precious metal supported on the carrier is used as the catalyst, the catalyst may include a commercially marketed catalyst and a catalyst manufactured by supporting the precious metal on the carrier. Since the process of supporting the precious metal on the carrier is well-known in this related field, the process will be readily understood by those skilled in the art although detailed descriptions thereof will be omitted in this specification.

The catalyst particles 31 may be contained in an amount of 20 to 80 wt % with respect to the total weight of the catalyst layer 30. There may be a problem of lowering catalytic activities when the catalyst particles 31 is contained in an amount of less than 20 wt % while the catalytic activities may be lowered as aggregation of the catalyst particles 31 reduces activation area when the catalyst particles 31 is contained in an amount of more than 80 wt %.

Further, the catalyst layer 30 may comprise a binder for adhesive strength improvement of the catalyst layer 30 and transfer of the hydrogen ions.

The binder preferably includes an ionomer having hydrogen ion conductivity. The ionomer may be a cationic conductor having a cation exchange group such as proton, or an anionic conductor having an anion exchange group such as a hydroxy ion, carbonate or bicarbonate.

The cation exchange group may be any one selected from the group consisting of a sulfonic acid group, a carboxyl group, a boronic acid group, a phosphoric acid group, an imide group, a phosphonic acid group, a sulfoneimide group, a sulfoneamide group and a combination thereof, and may generally be the sulfonic acid group or the carboxyl group.

The cationic conductor may include: a fluoro-based polymer which includes the cation exchange group and has fluorine included in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyester, polyethersulfone, polyether imide, polycarbonate, polystyrene, polyphenylene sulfide, polyether ether ketone, polyether ketone, polyarylethersulfone, polyphosphazene, polyphenylquinoxaline, or the like; a partially fluorinated polymer such as a polystyrene-graft-ethylene-tetrafluoroethylene copolymer, a polystyrene-graft-polytetrafluoroethylene copolymer, or the like; sulfonimide; and the like.

More specifically, when the cationic conductor is a hydrogen ion cationic conductor, the polymers may have a cation exchange group selected from the group consisting of a sulfonic acid group, a carboxylic acid group, a phosphoric acid group, a phosphonic acid group, and derivatives thereof included in a side chain thereof. Although specific examples of the polymers may include: fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof; and hydrocarbon-based polymers comprising sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and a mixture thereof, the polymers are not limited thereto.

Further, the cationic conductor may replace H with Na, K, Li, Cs or tetrabutylammonium at the cation exchange group of a side chain terminal. When NaOH is replaced with tetrabutyl ammonium during the preparation of a catalyst composition if H is replaced with Na at the cation exchange group of the side chain terminal, a replacement process is performed using tetrabutylammonium hydroxide, and K, Li or Cs can also be replaced using appropriate compounds. Since the replacement process is well-known in this related field, detailed descriptions thereof will be omitted in this specification.

The cationic conductor can be used singularly or in a combination, and the cationic conductor may be selectively used along with a non-conductive compound to further improve adhesive strength with an ion exchange membrane 10. It is preferable to use the usage amount-adjusted cationic conductor by adjusting the usage amount of the cationic conductor to be suitable for the purpose of use.

The non-conductive compound may include one or more selected from the group consisting of polytetrafluoroethylene (PTFE), tetrafluoroethylene-hexafluoropropylene copolymer (FEP), tetrafluoroethylene-perfluoroalkylvinylether copolymer (PFA), ethylene tetrafluoroethylene (ETFE), ethylene-chlorotrifluoroethylene copolymer (ECTFE), polyvinylidene fluoride, poly(vinylidene fluoride-hexafluoropropylene) copolymer (PVdF-HFP), dodecylbenzenesulfonic acid, and sorbitol.

The anionic conductor, as a polymer which can transfer anions such as the hydroxy ion, carbonate or bicarbonate, is commercially available in the form of a hydroxide or a halide (generally chloride), and the anionic conductor can be used in industrial water purification, metal separation or catalytic process, and the like.

The anionic conductor may generally include metal hydroxide-doped polymers, and may specifically include metal hydroxide-doped poly(ether sulfone), polystyrene, vinyl based polymer, poly(vinyl chloride), poly(vinylidene fluoride), poly(tetrafluoroethylene), poly(benzimidazole) or poly(ethyelene glycol), and the like.

Commercially available examples of the ionomer may include Nafion, Aquivion, and the like.

The ionomer may be contained in an amount of 20 to 80 wt % with respect to the total weight of the catalyst layer 30. When the ionomer is contained in an amount of less than 20 wt %, generated ions may not be transferred well. When the ionomer is contained in an amount of more than 80 wt %, it is difficult to supply hydrogen or oxygen (air), and activation area for enabling a reaction process to be performed may be reduced since pores are insufficient.

Meanwhile, the membrane-electrode assembly may further comprise an electrode substrate 40 at an outer side of the catalyst layer 30.

The electrode substrate 40 may include porous conductive substrates such that hydrogen or oxygen can be smoothly supplied. Although typical examples of the electrode substrate 40 may include carbon paper, carbon cloth, carbon felt and metal cloth (a porous film composed of a metal cloth in the fiber state, or a metal film formed on the surface of a cloth composed of polymer fibers), the typical examples of the electrode substrate 40 is not limited thereto. Further, it is preferable that the electrode substrate 40 includes an electrode substrate which is water repellent-treated with a fluorine-based resin since the water repellent-treated electrode substrate can prevent deterioration of reactant diffusion efficiency due to water generated when a fuel cell is driven. The fluorine-based resin may include polytetrafluoroethylene, polyvinylidene fluoride, polyhexafluoropropylene, polyperfluoroalkylvinylether, polyperfluorosulfonylfluoride alkoxy vinyl ether, fluorinated ethylene propylene, polychlorotrifluoroethylene, or a copolymer thereof.

In addition, the membrane-electrode assembly may further comprise a microporous layer for improving an effect of diffusing a reactant in the electrode substrate 40. The electrode substrate 40 may generally include conductive powders having a small particle diameter, e.g., carbon powder, carbon black, acetylene black, activated carbon, carbon fiber, fullerene, carbon nanotube, carbon nanowire, carbon nano-horn, or carbon nano-ring.

The microporous layer is manufactured by coating a composition comprising a conductive powder, a binder resin and a solvent on the electrode substrate 40. The binder resin may preferably include polytetrafluoroethylene, polyvinylidene fluoride, polyhexafluoropropylene, polyperfluoroalkylvinylether, polyperfluorosulfonylfluoride alkoxy vinyl ether, polyvinyl alcohol, cellulose acetate, or a copolymer thereof, and the like. The solvent may preferably include alcohols such as ethanol, isopropyl alcohol, n-propyl alcohol, butyl alcohol or the like, water, dimethyl acetamide, dimethyl sulfoxide, N-methylpyrrolidone, tetrahydrofuran, and the like. Although the coating process may include a screen printing method, a spray coating method, a coating method using a doctor blade, or the like according to viscosity of the composition, the coating process is not limited thereto.

On the other hand, the ion exchange membrane 10 includes an ionic conductor. The ionic conductor may be a cationic conductor having a cation exchange group such as proton, or an anionic conductor having an anion exchange group such as a hydroxy ion, carbonate or bicarbonate.

The cation exchange group may be any one selected from the group consisting of a sulfonic acid group, a carboxyl group, a boronic acid group, a phosphoric acid group, an imide group, a sulfoneimide group, a sulfoneamide group and a combination thereof, and may generally be the sulfonic acid group or the carboxyl group.

The cationic conductor may include: a fluoro-based polymer which includes the cation exchange group and has fluorine included in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyester, polyethersulfone, polyether imide, polycarbonate, polystyrene, polyphenylene sulfide, polyether ether ketone, polyether ketone, polyarylethersulfone, polyphosphazene, polyphenylquinoxaline, or the like; a partially fluorinated polymer such as a polystyrenegraft-ethylene-tetrafluoroethylene copolymer, a polystyrene-graft-polytetrafluoroethylene copolymer, or the like; sulfonimide; and the like.

More specifically, when the cationic conductor is a hydrogen ion cationic conductor, the polymers may have a cation exchange group selected from the group consisting of a sulfonic acid group, a carboxylic acid group, a phosphoric acid group, a phosphonic acid group, and derivatives thereof included in a side chain thereof. Although specific examples of the polymers may include: fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof; and hydrocarbon-based polymers comprising sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and a mixture thereof, the polymers are not limited thereto.

Meanwhile, the hydrocarbon-based polymer which not only has an excellent ion conduction function, but also is favorable in terms of a cost may be preferably used among the cationic conductors. Further, when the hydrocarbon-based polymer is used as the ionic conductor, and the hydrocarbon-based polymer is used as a porous support, the hydrocarbon-based polymer included in the hydrocarbon-based ionic conductor and the hydrocarbon-based polymer included in the porous support may be formed of material systems that are identical to each other. Specifically, when sulfonated polyimide (SPI) is used as the hydrocarbon-based ionic conductor, and polyimide is used as the porous support, adhesive properties between the hydrocarbon-based ionic conductor and the porous support can be further improved, and interfacial resistance therebetween can be further lowered.

The anionic conductor, as a polymer which can transfer anions such as the hydroxy ion, carbonate or bicarbonate, is commercially available in the form of a hydroxide or a halide (generally chloride), and the anionic conductor can be used in industrial water purification, metal separation or catalytic process, and the like.

The anionic conductor may generally include metal hydroxide-doped polymers, and may specifically include metal hydroxide-doped poly(ether sulfone), polystyrene, vinyl based polymer, poly(vinyl chloride), poly(vinylidene fluoride), poly(tetrafluoroethylene), poly(benzimidazole) or poly(ethyelene glycol), and the like.

On the other hand, the ion exchange membrane 10 may be formed in the form of a reinforced membrane in which the ionic conductor is filled in pores of a fluorine-based porous support such as e-PTFE, a porous nanoweb support manufactured by electrospinning or the like, and the like.

A method of manufacturing a membrane-electrode assembly according to another embodiment of the present invention comprises a step of coating an interfacial adhesive layer-forming composition on the catalyst layer 30 to form the interfacial adhesive layer 20 and a step of bonding the interfacial adhesive layer 20-formed catalyst layer 30 to the ion exchange membrane 10.

First, after preparing a catalyst layer forming composition comprising a catalyst, an ionomer and a solvent, the catalyst layer 30 is formed using the catalyst layer forming composition.

The solvent may be a solvent selected from the group consisting of water, a hydrophilic solvent, an organic solvent, and a mixture of one or more thereof.

Examples of the hydrophilic solvent may be solvents having one or more functional groups selected from the group consisting of alcohol, ketone, aldehyde, carbonate, carboxylate, carboxylic acid, ether and amide including $C_1$-$C_{12}$ linear or branched saturated or unsaturated hydrocarbons as a main chain, and may include an alicyclic or aromatic cyclo compound as at least a portion of the main chain thereof. Specific examples of the hydrophilic solvent may include: alcohol such as methanol, ethanol, isopropyl alcohol, ethoxy ethanol, n-propyl alcohol, butyl alcohol, 1,2-propandiol, 1-pantanol, 1,5-pentanediol, 1,9-nonanediol, or the like; ketone such as heptanone, octanone, or the like; aldehyde such as benzaldehyde, tolualdehyde, or the like; ester such as methyl pentanoate, ethyl 2-hydroxypropanoate, or the like; carboxylic acid such as pentanoic acid, heptanoic acid, or the like; ether such as methoxybenzene, dimethoxypropane, or the like; and amide such as propaneamide, butylamide, dimethyl acetamide, or the like.

The organic solvent may be selected from N-methylpyrrolidone, dimethyl sulfoxide, tetrahydrofuran, and a mixture thereof.

The solvent may be contained in an amount of 80 to 95 wt % with respect to the total weight of the catalyst layer forming composition. There may be a cracking problem generated during coating of the catalyst layer 30 or a dispersion problem due to high viscosity since a solid content of the solvent is too high when the solvent is contained in an amount of less than 80 wt % with respect to the total weight of the catalyst layer forming composition. The solvent may be unfavorable in activation of the catalyst layer 30 when the solvent is contained in an amount of more than 95 wt % with respect to the total weight of the catalyst layer forming composition.

As a specific example, the step of manufacturing the catalyst layer 30 using the catalyst layer forming composition may comprise coating the catalyst layer forming composition on a release film to manufacture the catalyst layer 30.

When the catalyst layer forming composition is coated on the release film, it is preferable to uniformly coat the catalyst layer forming composition to a dry thickness of 10 to 20 µm on the release film after continuously or intermittently transferring a catalyst layer forming composition having the catalyst dispersed therein to a coater.

More specifically, after continuously transferring the catalyst layer forming composition to a coater such as a die coater, a gravure coater, a bar coater, a comma coater, or the like according to viscosity of the catalyst layer forming composition through a pump, the catalyst layer forming composition is uniformly coated on a decal film using a method of slot die coating, bar coating, comma coating, screen printing, spray coating, doctor blade coating, bush, or the like such that the catalyst layer 30 has a dry thickness of 10 to 200 µm, more preferably 10 to 100 µm, the catalyst layer forming composition coated on the decal film passes through a drying furnace which is maintained to a predetermined temperature to volatilize the solvent.

Activities may be lowered since the catalyst has a low content when the catalyst layer forming composition is coated to a thickness of less than 1 μm, and resistance may be increased since moving distances of ions and electrons are increased when the catalyst layer forming composition is coated to a thickness of more than 200 μm.

The drying process may be performed at a drying temperature of 25 to 90° C. for a drying time of 12 hours or more. A problem that a sufficiently dried catalyst layer 30 cannot be formed may be generated when the drying temperature is less than 25° C., and when the drying time is less than 12 hours. Cracking or the like of the catalyst layer 30 may be generated when the drying process is performed at a temperature of more than 90° C. However, methods of coating and drying the catalyst layer forming composition are not limited to the above-described methods.

Next, an interfacial adhesive layer-forming composition is coated on the catalyst layer 30 to form an interfacial adhesive layer 20.

The interfacial adhesive layer-forming composition includes a fluorine-based ionomer having an equivalent weight (EW) of 500 to 1000 g/eq and a solvent. A repeated description of the fluorine-based ionomer is omitted since the description about the fluorine-based ionomer is the same as described above.

The interfacial adhesive layer-forming composition may comprise the fluorine-based ionomer in a concentration of 0.1 to 30%, or 1 to 20%. A concentration in the specification of the present invention means a percent concentration, and the percent concentration can be obtained by the percentage of a solute mass to a solution mass.

When the interfacial adhesive layer-forming composition comprises the fluorine-based ionomer in the concentration range, hydrogen ion conductivity and interfacial adhesion can be improved without increasing interfacial resistance of the membrane-electrode assembly. Hydrogen ion transfer capability may be lowered when the fluorine-based ionomer is included in a concentration of less than 0.1%, and distribution of the ionomer may be non-uniformly formed when the fluorine-based ionomer is included in a concentration of more than 30%.

The solvent may preferably include alcohols such as ethanol, isopropyl alcohol, n-propyl alcohol, butyl alcohol or the like, water, dimethyl acetamide, dimethyl sulfoxide, N-methylpyrrolidone, tetrahydrofuran, and the like.

The interfacial adhesive layer-forming composition may comprise a mixture of the fluorine-based ionomer and a hydrocarbon-based ionomer having an ion exchange capacity (IEC) of 0.8 to 4.0 meq/g. A repeated description of the hydrocarbon-based ionomer is omitted since the description about the hydrocarbon-based ionomer is the same as described above.

The interfacial adhesive layer-forming composition may be prepared by mixing a dispersion of the fluorine-based ionomer having a concentration of 0.1 to 30% with a dispersion of the hydrocarbon-based ionomer having a concentration of 0.1 to 30%.

The interfacial adhesive layer-forming composition may comprise the hydrocarbon-based ionomer in a concentration of 0.1 to 30%, or 1 to 15%. When the interfacial adhesive layer-forming composition comprises the hydrocarbon-based ionomer in the concentration range, hydrogen ion conductivity and interfacial adhesion can be improved without increasing interfacial resistance of the membrane-electrode assembly. A hydrogen ion transfer path may not be formed effectively when the hydrocarbon-based ionomer is included in a concentration of less than 0.1%, and non-uniform distribution and resistance components of the ionomer may be increased when the hydrocarbon-based ionomer is included in a concentration of more than 30%.

In addition, the interfacial adhesive layer-forming composition may further comprise a nanopowder having a particle diameter of 1 to 50 nm. A repeated description of the nanopowder is omitted since the description about the nanopowder is the same as described above.

The interfacial adhesive layer 20 may be formed by spray coating the interfacial adhesive layer-forming composition on the catalyst layer 30. When the interfacial adhesive layer-forming composition is coated by a spray coating method, there are effects that the interfacial adhesive layer 20 is not excessively permeated into the catalyst layer 30, is permeated into the catalyst layer 30 in a predetermined depth from the surface of the catalyst layer 30, and is filled in surface curves of the catalyst layer 30. The spray coating method prevents an excessive amount of the interfacial adhesive layer-forming composition from being permeated into the catalyst layer 30 and enables the interfacial adhesive layer-forming composition to be selectively filled in pores existing in the surface of the catalyst layer 30 by coating the interfacial adhesive layer-forming composition on the surface of the catalyst layer 30 in a state that the interfacial adhesive layer-forming composition has an increased viscosity as the solvent is partially volatilized from the interfacial adhesive layer-forming composition while the interfacial adhesive layer-forming composition is being sprayed.

Next, the catalyst layer 30 and the ion exchange membrane 10 are bonded by the medium of the interfacial adhesive layer 20.

The cut catalyst layer 30 may be bonded to the ion exchange membrane 10 after cutting the release film and the catalyst layer 30 having the interfacial adhesive layer formed thereon to a required size.

The method of bonding the catalyst layer 30 and the ion exchange membrane 10 by the medium of the interfacial adhesive layer 20 may include a transfer method as an example, and the transfer method may be performed by a hot pressing process of applying heat and pressure to a metal press alone or the metal press over which a soft board of rubber material such as silicone rubber material is put.

The transfer method may be performed under conditions of 80 to 150° C. and 50 to 200 kgf/cm². Transferring of the catalyst layer (30) onto the release film may not be properly achieved when the hot pressing process is performed under conditions of less than 80° C. and less than 50 kgf/cm², there is a concern that structural change of the catalyst layer 30 may occur as polymer of the ion exchange membrane 10 is burnt when the hot pressing process is performed at a condition of more than 150° C., and transferring may not be properly achieved as an effect of pressing the catalyst layer 30 is more increased than an effect of transferring the catalyst layer 30 when the hot pressing process is performed at a condition of more than 200 kgf/cm².

A fuel cell according to another embodiment of the present invention includes the membrane-electrode assembly.

Figure 2:
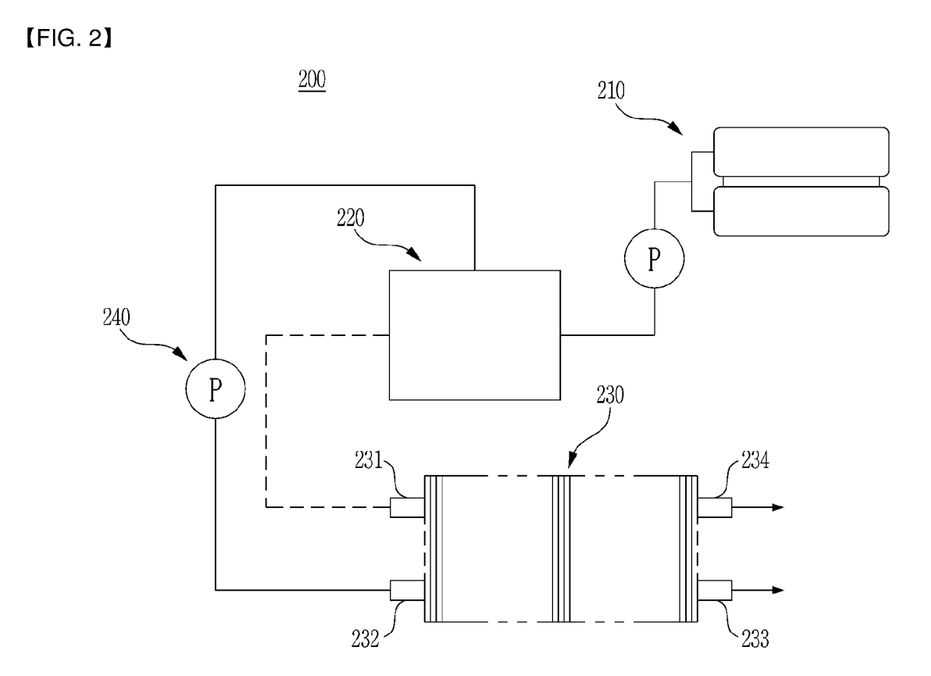
FIG. 2 is a mimetic diagram illustrating the overall configuration of a fuel cell according to an embodiment of the present invention.

FIG. 2 is a mimetic diagram illustrating the overall configuration of the fuel cell.

Referring to FIG. 2, the fuel cell 200 includes a fuel supply unit 210 which supplies a mixed fuel in which fuel and water are mixed, a reforming unit 220 which reforms the mixed fuel to generate a hydrogen gas-containing reformed gas, a stack 230 which generates electric energy by making the hydrogen gas-containing reformed gas supplied from the reforming unit 220 perform an electrochemical reaction with an oxidizer, and an oxidizer supply unit 240 which supplies the oxidizer to the reforming unit 220 and the stack 230.

The stack 230 includes a plurality of unit cells which generate electric energy by inducing an oxidation/reduction reaction of the hydrogen gas-containing reformed gas supplied from the reforming unit 220 and the oxidizer supplied from the oxidizer supply unit 240.

Each of the unit cells means an electricity-generating unit cell, and includes the membrane-electrode assembly which oxidizes or reduces the hydrogen gas-containing reformed gas and oxygen in the oxidizer, and separators (or called as a bipolar plate, and hereinafter, referred to as "separators") for supplying the hydrogen gas-containing reformed gas and the oxidizer to the membrane-electrode assembly. The separators are disposed at both sides of the membrane-electrode assembly positioned at the center. In this case, separators which are each positioned at an outermost side of the stack may particularly be referred to as end plates.

One end plate out of the separators includes a first supply pipe 231 having a pipe shape for injecting the hydrogen gas-containing reformed gas supplied from the reforming unit 220 and a second supply pipe 232 having a pipe shape for injecting an oxygen gas, and the other end plate out of the separators includes a first discharge pipe 233 for discharging a hydrogen gas-containing reformed gas that has been unreacted and finally remained the plurality of unit cells to the outside and a second discharge pipe 234 for discharging an oxidizer that has been unreacted and finally remained in the unit cells to the outside.

Mode(s) for Carrying Out the Invention

Hereinafter, the embodiments are illustrated in more detail with reference to examples. Preferred embodiments of the present invention will be described below in more detail. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Manufacturing Example: Manufacturing Membrane-Electrode Assemblies

Example 1

A cathode electrode composition was prepared by dispersing 88 wt % of a PtCo/C cathode catalyst and 12 wt % of a Nafion®/H$_2$O/2-propanol solution as a binder by a stirring and ultrasonic method. After doctor blade-coating the prepared cathode electrode composition on a Teflon release film, the cathode electrode composition doctor blade-coated on the Teflon release film was dried at 60° C. for 6 hours to manufacture an anode electrode. In this case, a catalyst loading amount in the cathode electrode was about 0.40 mg/cm$^2$.

An anode electrode composition was prepared by dispersing 88 wt % of a PtRu/C anode catalyst and 12 wt % of the Nafion®/H$_2$O/2-propanol solution as the binder by the stirring and ultrasonic method. After doctor blade-coating the prepared anode electrode composition on the Teflon release film, the anode electrode composition doctor blade-coated on the Teflon release film was dried at 60° C. for 6 hours to manufacture an anode electrode. In this case, a catalyst loading amount in the anode electrode was about 0.10 mg/cm$^2$.

An interfacial adhesive layer-forming composition comprising 5 wt % of a fluorine-based ionomer poly(perfluorosulfonic acid) (PFSA) having an equivalent weight (EW) of 700 g/eq and 95 wt % of a H$_2$O/2-propanol solution was prepared.

The prepared interfacial adhesive layer-forming composition was spray coated in an amount of 0.11 mg/cm2 on the manufactured electrodes at room temperature to form an interfacial adhesive layer having a thickness of about 0.5 μm on the surfaces of the electrodes.

After interposing a fluorine-based polymer electrolyte membrane of perfluorosulfonic acid (PFSA) having a thickness of 15 to 20 μm between the manufactured cathode and anode electrodes, the fluorine-based polymer electrolyte membrane of perfluorosulfonic acid (PFSA) interposed between the manufactured cathode and anode electrodes was pressed by heat and pressure conditions of 160° C. and 20 kgf/cm$^2$ for 3 minutes to manufacture a membrane-electrode assembly in which the cathode and anode electrodes were bonded to the polymer electrolyte membrane.

Example 2

A membrane-electrode assembly was manufactured by performing the same manufacturing process as in Example 1 except that a fluorine-based ionomer PFSA having an equivalent weight (EW) of 700 g/eq was used, and the interfacial adhesive layer was formed to a thickness of about 1.0 μm when preparing the interfacial adhesive layer-forming composition in Example 1.

Example 3

A membrane-electrode assembly was manufactured by performing the same manufacturing process as in Example 1 except that a fluorine-based ionomer PFSA having an equivalent weight (EW) of 700 g/eq was used, and the interfacial adhesive layer was formed to a thickness of about 2.0 μm when preparing the interfacial adhesive layer-forming composition in Example 1.

Example 4

A membrane-electrode assembly was manufactured by performing the same manufacturing process as in Example 1 except that a fluorine-based ionomer PFSA having an equivalent weight (EW) of 950 g/eq was used, and the interfacial adhesive layer was formed to a thickness of about 0.5 μm when preparing the interfacial adhesive layer-forming composition in Example 1.

Example 5

A membrane-electrode assembly was manufactured by performing the same manufacturing process as in Example 1 except that a fluorine-based ionomer PFSA having an equivalent weight (EW) of 950 g/eq was used, and the interfacial adhesive layer was formed to a thickness of about 1.0 μm when preparing the interfacial adhesive layer-forming composition in Example 1.

Example 6

A membrane-electrode assembly was manufactured by performing the same manufacturing process as in Example 1 except that a fluorine-based ionomer PFSA having an equivalent weight (EW) of 950 g/eq was used, and the interfacial adhesive layer was formed to a thickness of about 2.0 μm when preparing the interfacial adhesive layer-forming composition in Example 1.

Comparative Example 1

A membrane-electrode assembly was manufactured by performing the same manufacturing process as in Example 1 except that the interfacial adhesive layer was not formed in Example 1.

Comparative Example 2

A membrane-electrode assembly was manufactured by performing the same manufacturing process as in Example 1 except that Nafion (a product of Dupont Corporation) having an equivalent weight (EW) of 1100 g/eq was used, and the interfacial adhesive layer was formed to a thickness of about 1.0 μm when preparing the interfacial adhesive layer-forming composition in Example 1.

Example 7

A membrane-electrode assembly was manufactured by performing the same manufacturing process as in Example 1 except that the interfacial adhesive layer was formed to a thickness of 0.005 μm when preparing the interfacial adhesive layer-forming composition in Example 1.

However, when the interfacial adhesive layer was formed to a thickness of 0.005 μm, performance measurements were impossible since a portion coated with a small amount of the interfacial adhesive layer and a plurality of portions which were not coated with the interfacial adhesive layer were existed on the electrodes.

Example 8

A membrane-electrode assembly was manufactured by performing the same manufacturing process as in Example 1 except that a fluorine-based ionomer PFSA having an equivalent weight (EW) of 700 g/eq was used, and the interfacial adhesive layer was formed to a thickness of about 5.5 μm when preparing the interfacial adhesive layer-forming composition in Example 1.

Example 9

A cathode electrode composition was prepared by dispersing 88 wt % of a PtCo/C cathode catalyst and 12 wt % of a Nafion®/H$_2$O/2-propanol solution as a binder by a stirring and ultrasonic method. After doctor blade-coating the prepared cathode electrode composition on a Teflon release film, the cathode electrode composition doctor blade-coated on the Teflon release film was dried at 60° C. for 6 hours to manufacture an anode electrode. In this case, a catalyst loading amount in the cathode electrode was about 0.40 mg/cm$^2$.

An anode electrode composition was prepared by dispersing 88 wt % of a PtRu/C anode catalyst and 12 wt % of the Nafion®/H$_2$O/2-propanol solution as the binder by the stirring and ultrasonic method. After doctor blade-coating the prepared anode electrode composition on the Teflon release film, the anode electrode composition doctor blade-coated on the Teflon release film was dried at 60° C. for 6 hours to manufacture an anode electrode. In this case, a catalyst loading amount in the anode electrode was about 0.10 mg/cm$^2$.

An interfacial adhesive layer-forming composition was prepared from fluorine-based and hydrocarbon-based ionomer blends comprising a fluorine-based ionomer PFSA having an equivalent weight (EW) of 700 g/eq and a sulfonated polyether sulfone having an ion exchange capacity (IEC) of 2.3 meq/g at a weight ratio of 1:2. In this case, the interfacial adhesive layer-forming composition contained the fluorine-based ionomer in a concentration of 1.25%, and contained the hydrocarbon-based ionomer in a concentration of 2.5%.

The prepared interfacial adhesive layer-forming composition was spray coated on the manufactured electrodes at room temperature to form an interfacial adhesive layer on the surfaces of the electrodes. In this case, a composition for the fluorine-based and hydrocarbon-based ionomer blends had a loading amount of 0.13 mg/cm2, and an interfacial adhesive layer of the fluorine-based and hydrocarbon-based ionomer blends had a thickness of about 0.5 μm.

After interposing a fluorine-based polymer electrolyte membrane of perfluorosulfonic acid (PFSA) having a thickness of 15 to 20 μm between the manufactured cathode and anode electrodes, the fluorine-based polymer electrolyte membrane of perfluorosulfonic acid (PFSA) interposed between the manufactured cathode and anode electrodes was pressed by heat and pressure conditions of 160° C. and 20 kgf/cm$^2$ for 3 minutes to manufacture a membrane-electrode assembly in which the cathode and anode electrodes were bonded to the polymer electrolyte membrane.

Example 10

A membrane-electrode assembly was manufactured by performing the same manufacturing process as in Example 9 except that the interfacial adhesive layer was formed to a thickness of 1.0 μm when preparing the interfacial adhesive layer-forming composition in Example 9.

Example 11

A membrane-electrode assembly was manufactured by performing the same manufacturing process as in Example 9 except that the weight ratio of the fluorine-based and hydrocarbon-based ionomer blends was changed to 1:4, and the interfacial adhesive layer was formed to a thickness of about 0.5 μm when preparing the interfacial adhesive layer-forming composition in Example 9.

Example 12

A membrane-electrode assembly was manufactured by performing the same manufacturing process as in Example 9 except that the weight ratio of the fluorine-based and hydrocarbon-based ionomer blends was changed to 1:4, and the interfacial adhesive layer was formed to a thickness of about 1.0 μm when preparing the interfacial adhesive layer-forming composition in Example 9.

Example 13

A membrane-electrode assembly was manufactured by performing the same manufacturing process as in Example 9 except that the interfacial adhesive layer was formed to a thickness of 0.005 μm when preparing the interfacial adhesive layer-forming composition in Example 9.

However, when the interfacial adhesive layer was formed to a thickness of 0.005 μm, performance measurements were impossible since a portion coated with a small amount of the interfacial adhesive layer and a plurality of portions which were not coated with the interfacial adhesive layer were existed on the electrodes.

Example 14

A membrane-electrode assembly was manufactured by performing the same manufacturing process as in Example 9 except that the weight ratio of the fluorine-based and hydrocarbon-based ionomer blends was changed to 1:4, and the interfacial adhesive layer was formed to a thickness of 6 μm when preparing the interfacial adhesive layer-forming composition in Example 9.

Example 15

A membrane-electrode assembly was manufactured by performing the same manufacturing process as in Example 1 except that $SiO_2$ nanopowder having an average particle diameter of 7 nm was added in an amount of 1 wt %, and the interfacial adhesive layer was formed to a thickness of about 1.0 μm when preparing the interfacial adhesive layer-forming composition in Example 1.

(Example 16)

A membrane-electrode assembly was manufactured by performing the same manufacturing process as in Example 1 except that $SiO_2$ nanopowder having an average particle diameter of 7 nm was added in an amount of 1 wt %, and the interfacial adhesive layer was formed to a thickness of about 2.0 μm when preparing the interfacial adhesive layer-forming composition in Example 1.

Example 17

A membrane-electrode assembly was manufactured by performing the same manufacturing process as in Example 1 except that $SiO_2$ nanopowder having an average particle diameter of 7 nm was added in an amount of 5 wt %, and the interfacial adhesive layer was formed to a thickness of about 1.0 μm when preparing the interfacial adhesive layer-forming composition in Example 1.

Example 18

A membrane-electrode assembly was manufactured by performing the same manufacturing process as in Example 1 except that $SiO_2$ nanopowder having an average particle diameter of 7 nm was added in an amount of 5 wt %, and the interfacial adhesive layer was formed to a thickness of about 2.0 μm when preparing the interfacial adhesive layer-forming composition in Example 1.

Example 19

A membrane-electrode assembly was manufactured by performing the same manufacturing process as in Example 1 except that $SiO_2$ nanopowder having an average particle diameter of 7 nm was added in an amount of 0.05 wt %, and the interfacial adhesive layer was formed to a thickness of about 1.0 μm when preparing the interfacial adhesive layer-forming composition in Example 1.

Example 20

A membrane-electrode assembly was manufactured by performing the same manufacturing process as in Example 1 except that the nanopowder was added in an amount of 25 wt % when preparing the interfacial adhesive layer-forming composition in Example 1.

However, when the nanopowder was added in an amount of 25 wt %, it was impossible to perform a spray coating process due to a heavy agglomeration phenomenon.

Example 21

A membrane-electrode assembly was manufactured by performing the same manufacturing process as in Example 15 except that the interfacial adhesive layer was formed to a thickness of 0.005 μm when preparing the interfacial adhesive layer-forming composition in Example 15.

However, when the interfacial adhesive layer was formed to a thickness of 0.005 μm, performance measurements were impossible since a portion coated with a small amount of the interfacial adhesive layer and a plurality of portions which were not coated with the interfacial adhesive layer were existed on the electrodes.

Example 22

A membrane-electrode assembly was manufactured by performing the same manufacturing process as in Example 1 except that $SiO_2$ nanopowder having an average particle diameter of 7 nm was added in an amount of 5 wt %, and the interfacial adhesive layer was formed to a thickness of 6 μm when preparing the interfacial adhesive layer-forming composition in Example 1.

Example 23

A membrane-electrode assembly was manufactured by performing the same manufacturing process as in Example 1 except that $CeO_2$ nanopowder having an average particle diameter of 25 nm was added in an amount of 5 wt %, and the interfacial adhesive layer was formed to a thickness of about 1.0 μm when preparing the interfacial adhesive layer-forming composition in Example 1.

Experimental Examples: Measuring Performance of Membrane-Electrode Assemblies

Experimental Example 1: Measuring Interfacial Adhesion

In order to evaluate interfacial adhesion, nitrogen was injected into the respective cathodes and anodes while maintaining the membrane-electrode assemblies manufactured in Examples and Comparative Examples at the temperature 60° C. Interfacial desorption was accelerated by repeatedly injecting humidified nitrogen and dried nitrogen into the cathodes and anodes, thereby repeatedly inducing expansion and contraction of the membrane-electrode assemblies due to drying and hydration thereof. Comparison results are shown in the following table 1 by comparing ohmic resistance values after performing total 5,000 cycles when a process of injecting the humidified nitrogen and dried nitrogen one time for a total of 20 minutes was 1 cycle.

The ohmic resistance values were measured by comparing alternating current impedances of *MEA single cells in a constant current condition of 300 mA/cm^2. In the impedance values, x-axis is an impedance real part (Z'), and y-axis is an impedance imaginary part (Z"). A value of the real part at a point where an impedance curve joins the x-axis is a resistance component including an electrolyte membrane resistance and an interfacial resistance as an ohmic resistance.

TABLE 1

| | Ohmic resistance ($\Omega cm^2$) before accelerated evaluation | Ohmic resistance ($\Omega cm^2$) after accelerated evaluation | Ohmic resistance increase rate (%) |
|---|---|---|---|
| Example 1 | 0.1683 | 0.1955 | 16.2 |
| Example 2 | 0.1829 | 0.1954 | 6.8 |
| Example 3 | 0.2182 | 0.2307 | 5.7 |
| Example 5 | 0.1959 | 0.2076 | 6.0 |
| Comparative Example 1 | 0.2421 | 0.9426 | 289.3 |
| Comparative Example 2 | 0.2137 | 0.2268 | 6.1 |
| Example 9 | 0.1789 | 0.2132 | 19.2 |
| Example 10 | 0.1985 | 0.2175 | 9.6 |
| Example 12 | 0.2015 | 0.2426 | 20.4 |
| Example 15 | 0.2022 | 0.2415 | 19.4 |
| Example 17 | 0.2047 | 0.2468 | 20.6 |
| Example 18 | 0.2360 | 0.2797 | 18.5 |
| Example 19 | 0.2136 | 0.2531 | 18.5 |
| Example 22 | 0.2636 | 0.5986 | 127.1 |

As shown in the Table 1, the membrane-electrode assembly of Comparative Example 1 into which the interfacial adhesive layer of the present invention was not introduced shows a greatly increased resistance value after the accelerated evaluation, while the membrane-electrode assemblies of Examples into which the interfacial adhesive layers were introduced onto the catalyst layer show low ohmic resistance increase rates. As a result, an interfacial adhesive layer effect of improving interfacial adhesion stability can be confirmed.

Experimental Example 2: Measuring Hydrogen Gas Crossover

Figure 3:
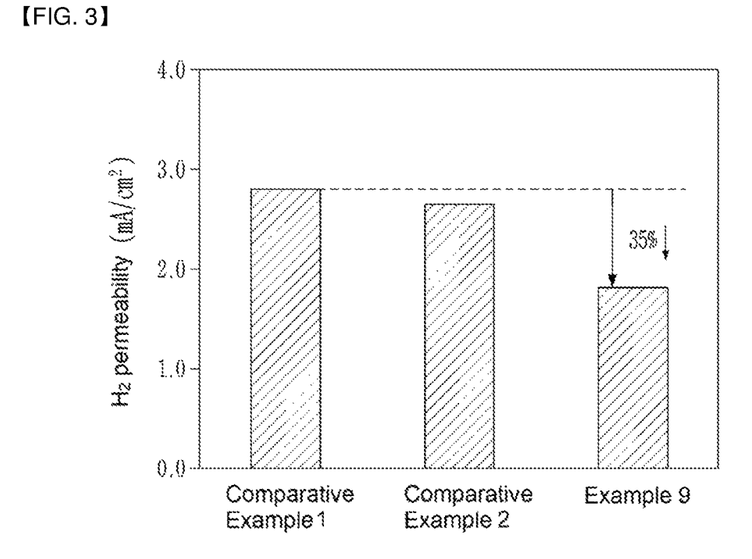
FIG. 3 is a graph showing hydrogen gas permeability values measured at Experimental Example 2 of the present invention.

After measuring hydrogen gas permeability values of the membrane-electrode assemblies manufactured in Comparative Example 1, Comparative Example 2 and Example 9, and measurement results are shown in FIG. 3.

The hydrogen gas permeability values were measured using linear sweep voltammetry (LSV) method. Further, hydrogen and air were supplied in a fully humidified state, and the hydrogen gas permeability values were measured in potential conditions of 0.2 V to evaluate the linear sweep voltammetry (LSV) method.

Referring to FIG. 3, as the electrode-membrane assembly manufactured in Example 9 has a mixture of a fluorine-based ionomer and a hydrocarbon-based ionomer included in the interfacial adhesive layer, it can be confirmed that the electrode-membrane assembly manufactured in Example 9 has an effect of reducing 35% of the hydrogen gas permeability without affecting interfacial bonding compared to the electrode-membrane assembly manufactured in Comparative Example 1.

Further, it can be also confirmed that the electrode-membrane assembly manufactured in Example 9 has a greatly reduced hydrogen gas permeability compared to the electrode-membrane assembly manufactured in Comparative Example 2 having only the fluorine-based ionomer included in the interfacial adhesive layer.

Experimental Example 3: Performance Measurement 1 of Membrane-Electrode Assemblies After measuring current density values at 0.6 V and voltage values at 1.5 A/cm$^2$ at temperature and relative humidity (RH) conditions of 65° C. and 50% with respect to the membrane-electrode assemblies manufactured in Comparative Examples and Examples, measurement results are shown in the following Table 2.

TABLE 2

| | Current density (A/cm2) @ 65° C., 50% RH | Cell voltage (V) @ 65° C., 50% RH |
|---|---|---|
| Example 1 | 1.30 | 0.565 |
| Example 2 | 1.40 | 0.585 |
| Example 3 | 1.35 | 0.555 |
| Example 5 | 1.35 | 0.575 |
| Comparative Example 1 | 1.25 | 0.555 |
| Comparative Example 2 | 1.25 | 0.565 |
| Example 8 | 1.20 | 0.515 |
| Example 9 | 1.30 | 0.565 |
| Example 10 | 1.35 | 0.575 |
| Example 12 | 1.25 | 0.565 |
| Example 14 | 1.05 | 0.505 |
| Example 15 | 1.30 | 0.560 |
| Example 17 | 1.45 | 0.595 |
| Example 18 | 1.30 | 0.565 |
| Example 19 | 1.25 | 0.550 |
| Example 22 | 0.95 | 0.485 |

Referring to the Table 2, it can be confirmed that the membrane-electrode assemblies manufactured in Examples exhibit excellent performance compared to the membrane-electrode assemblies manufactured in Comparative Examples. Specifically, it is possible to observe phenomena that current density values are increased as equivalent weight (EW) values decrease at a relative humidity (RH) condition of 50% when comparing results of the membrane-electrode assemblies (MEAs) including the interfacial adhesive layer with the same thickness.

Experimental Example 4: Performance Measurement 2 of Membrane-Electrode Assemblies Further, after measuring voltage values respectively at 1.5 and 2.2 A/cm$^2$ at temperature and relative humidity (RH) conditions of 65° C. and 50% with respect to the membrane-electrode assemblies manufactured in Comparative Examples and Examples, measurement results are shown in the following Table 3.

TABLE 3

| | Cell voltage (V) @ 1.5 A/cm$^2$ | Cell voltage (V) @ 2.2 A/cm$^2$ |
|---|---|---|
| Example 2 | 0.585 | 0.504 |
| Example 5 | 0.575 | 0.459 |
| Comparative Example 1 | 0.555 | 0.336 |
| Comparative Example 2 | 0.565 | 0.383 |

Referring to the Table 3, it can be confirmed that the MEAs manufactured in Examples have higher voltage values at high current density values than the MEAs manufactured in Comparative Examples. Further, it is possible to observe phenomena that voltage values at a high current density (2.2 A/cm$^2$) are increased as equivalent weight (EW) values decrease when comparing results of the membrane-electrode assemblies (MEAs) including the interfacial adhesive layer with the same thickness.

Experimental Example 5: Performance Measurement 3 of Membrane-Electrode Assemblies After measuring open circuit voltage (OCV) conservation rates of the membrane-electrode assemblies manufactured in Comparative Example 2 and Example 23, measurement results are shown in FIG. 4.

In order to measure the open circuit voltage (OCV) conservation rates, operation of a fuel cell was performed by forming microporous layers on both sides of a unit cell having an electrode area of 25 cm$^2$, and supplying hydrogen and air passing through a humidifier respectively to electrodes formed on both sides of the microporous layers. The open circuit voltage (OCV) conservation rates were performed through an open circuit voltage operation at temperature and relative humidity (RH) conditions of 90° C. and 30%, and the open circuit voltage (OCV) conservation rates were shown through difference values between an initial open circuit voltage value and open circuit voltage values after performing the operation for 500 hours.

Figure 4:
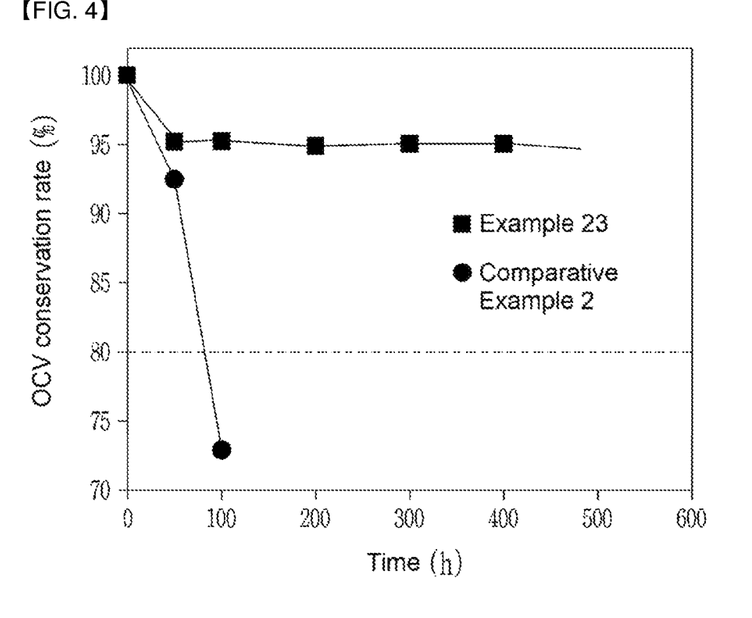
FIG. 4 is a graph showing open circuit voltage holding ratios measured in Experimental Example 5 of the present invention.

Referring to FIG. 4, it can be confirmed that, although the membrane-electrode assembly manufactured in Comparative Example 2 includes an interfacial adhesive layer, the open circuit voltage conservation rate of the membrane-electrode assembly manufactured in Comparative Example 2 is lowered to less than 80% within 100 hours, whereas the open circuit voltage conservation rate of the membrane-electrode assembly manufactured in Example 23 is not lowered to less than 80%, but maintains a level of 95% even after 500 hours since the membrane-electrode assembly manufactured in Example 23 has the nanopowder included in the interfacial adhesive layer.

Although the present invention has been described along with the accompanying drawings, this is only one of various examples including the gist of the present invention and has an object of enabling a person having ordinary skill in the art to easily practice the invention. Accordingly, it is evident that the present invention is not limited to the aforementioned examples. Accordingly, the range of protection of the present invention should be interpreted based on the following claims, and all of technological spirits within the equivalents of the present invention may fall within the range of right of the present invention by changes, substitutions and replacements without departing from the gist of the present invention. Furthermore, it is evident that the configurations of some drawings have been provided to more clearly describe configurations and have been more exaggerated or reduced than actual configurations.

DESCRIPTION OF MARKS

10: Ion exchange membrane
20: Interfacial adhesive layer
30: Catalyst layer
31: Catalyst particles
40: Electrode substrate
200: Fuel cell
210: Fuel supply unit
220: Reforming unit
230: Stack
231: First supply pipe
232: Second supply pipe
233: First discharge pipe
234: Second discharge pipe
240: Oxidizer supply unit

INDUSTRIAL APPLICABILITY

The present invention relates to a membrane-electrode assembly, a method of manufacturing the same, and a fuel cell including the same. The membrane-electrode assembly can overcome a problem of deteriorating hydrogen ion conduction performance of the membrane-electrode assembly by improving interfacial adhesion and interfacial stability between the electrodes and the ion exchange membrane, reduces crossover of hydrogen gas by decreasing gas permeability without an increase in interfacial resistance or a problem in interfacial bonding, and can improve performance and durability under the conditions of high temperature and low humidity.

The invention claimed is:

1. A membrane-electrode assembly comprising:
   a catalyst layer having pores therein;
   an interfacial adhesive layer having a first part disposed on the catalyst layer and a second part filling a portion of the pores of the catalyst layer; and
   an ion exchange membrane which is positioned on the interfacial adhesive layer and bonded to the catalyst layer by means of the interfacial adhesive layer,
   wherein the interfacial adhesive layer includes a fluorine-based ionomer having an equivalent weight (EW) of 500 to 1000 g/eq,
   wherein the interfacial adhesive layer further includes a nanopowder having an average particle diameter of 1 to 50 nm, and
   wherein the nanopowder is an ionic conductor, and
   wherein the ionic conductor is any one hydrophilic inorganic additive selected from the group consisting of $SnO_2$, fumed silica, clay, alumina, mica, zeolite, phosphotungstic acid, silicon tungstic acid, zirconium hydrogen phosphate, and a mixture thereof.

2. The membrane-electrode assembly of claim 1, wherein the interfacial adhesive layer is permeated into the catalyst layer in an average depth corresponding to 1 to 10% of an average thickness of the catalyst layer.

3. The membrane-electrode assembly of claim 1, wherein the interfacial adhesive layer has an average thickness of 0.01 to 5 μm.

4. The membrane-electrode assembly of claim 1, wherein the interfacial adhesive layer further includes a hydrocarbon-based ionomer having an ion exchange capacity (IEC) of 0.8 to 4.0 meq/g.

5. The membrane-electrode assembly of claim 4, wherein the fluorine-based ionomer and the hydrocarbon-based ionomer are mixed at a weight ratio of 20:1 to 1:20.

6. The membrane-electrode assembly of claim 1, wherein the interfacial adhesive layer comprises 0.1 to 20 wt % of the nanopowder with respect to the total weight of the interfacial adhesive layer.

7. The membrane-electrode assembly of claim 1, wherein the interfacial adhesive layer further includes a radical scavenger which is any one selected from the group consisting of cerium, tungsten, ruthenium, palladium, silver, rhodium, cerium, zirconium, yttrium, manganese, molybdenum, lead, vanadium, titanium, ion forms thereof, oxide forms thereof, salt forms thereof, and mixtures thereof.

8. The membrane-electrode assembly of claim 1, wherein the interfacial adhesive layer further includes an oxygen revolution reaction catalyst which is any one catalyst selected from the group consisting of platinum, gold, palladium, rhodium, iridium, ruthenium, osmium, a platinum alloy, alloys thereof, and mixtures thereof.

9. A method of manufacturing a membrane-electrode assembly, the method comprising:
coating an interfacial adhesive layer-forming composition on a catalyst layer to form an interfacial adhesive layer, a portion of the composition permeating into the catalyst layer; and
bonding the coated catalyst layer to an ion exchange membrane,
wherein the composition comprises a fluorine-based ionomer having equivalent weight (EW) of 500 to 1000 g/eq and a nanopowder having an average particle diameter of 1 to 50 nm,
wherein the nanopowder is an ionic conductor, and
wherein the ionic conductor is any one hydrophilic inorganic additive selected from the group consisting of $SnO_2$, fumed silica, clay, alumina, mica, zeolite, phosphotungstic acid, silicon tungstic acid, zirconium hydrogen phosphate, and a mixture thereof.

10. The method of claim 9, wherein the interfacial adhesive layer is formed by spray coating the interfacial adhesive layer-forming composition on the catalyst layer.

11. The method of claim 9, wherein the composition further comprises a hydrocarbon-based ionomer having ion exchange capacity (IEC) of 0.8 to 4.0 meq/g.

12. A fuel cell including the membrane-electrode assembly according to claim 1.

* * * * *